(12) United States Patent
Koperberg et al.

(10) Patent No.: US 11,230,378 B2
(45) Date of Patent: Jan. 25, 2022

(54) CONTAINER FOR AERIAL DELIVERY OF GOODS

(71) Applicant: STICHTING WINGS FOR AID FOUNDATION, Hilversum (NL)

(72) Inventors: Barry Willem Ferdinand Koperberg, Hilversum (NL); Henricus Alphonsius Cornelis Van Dorst, Delft (NL); Alexis Laurent Sebastien Roseillier, Utrecht (NL)

(73) Assignee: STICHTING WINGS FOR AID FOUNDATION, Hilversum (NL)

( * ) Notice: Subject to any disclaimer, the term of this patent is extended or adjusted under 35 U.S.C. 154(b) by 135 days.

(21) Appl. No.: 16/649,241

(22) PCT Filed: Sep. 25, 2018

(86) PCT No.: PCT/NL2018/050635
§ 371 (c)(1),
(2) Date: Mar. 20, 2020

(87) PCT Pub. No.: WO2019/059775
PCT Pub. Date: Mar. 28, 2019

(65) Prior Publication Data
US 2020/0298973 A1 Sep. 24, 2020

(30) Foreign Application Priority Data
Sep. 25, 2017 (NL) ...................................... 2019621

(51) Int. Cl.
*B64D 1/14* (2006.01)
*B64D 19/00* (2006.01)

(52) U.S. Cl.
CPC .............. *B64D 1/14* (2013.01); *B64D 19/00* (2013.01)

(58) Field of Classification Search
CPC ............. B64D 1/14; B64D 1/02; B64D 19/00
See application file for complete search history.

(56) References Cited

U.S. PATENT DOCUMENTS 2,450,992 A    10/1948  Sanderson
2,495,486 A *   1/1950  Stevenson ................ B64D 1/02
                                                    244/138 A (Continued)

FOREIGN PATENT DOCUMENTS

GB        1211240 A      11/1970
JP        S55174100 U    12/1980
WO     2013/050564 A1     4/2013

OTHER PUBLICATIONS

International Search Report dated Feb. 12, 2019, corresponding to Application No. PCT/NL2018/050635.

(Continued)

*Primary Examiner* — Christopher D Hutchens
(74) *Attorney, Agent, or Firm* — Patterson & Sheridan, L.L.P.

(57) ABSTRACT

A container for dropping from an aerial vehicle comprises a bottom section and a plurality of side walls. Wings are connected to the upper edges of the side walls to allow pivoting of the wing between a passive position, in which the wing extends along the corresponding side wall, and a deployed position, in which the wing extends substantially transversely relative to the corresponding side wall. Reinforcing units increase the bending stiffness of the wings. Retaining units limit pivoting of the wings beyond the deployed position.

24 Claims, 11 Drawing Sheets

(56) References Cited

U.S. PATENT DOCUMENTS

| | | | | |
|---|---|---|---|---|
| 2,706,097 | A | * | 4/1955 | Johnson .................. F42B 10/50 |
| | | | | 244/138 A |
| 3,168,267 | A | | 2/1965 | Ferris |
| 3,265,136 | A | * | 8/1966 | Wojciechowski ....... B64D 1/02 |
| | | | | 416/132 R |
| 5,947,419 | A | | 9/1999 | Warren et al. |
| 2012/0325693 | A1 | * | 12/2012 | Mooney .................. B64D 1/10 |
| | | | | 206/216 |
| 2013/0334371 | A1 | * | 12/2013 | Potter .................... B65D 77/02 |
| | | | | 244/137.1 |

OTHER PUBLICATIONS

Netherlands Search Report dated May 30, 2018, corresponding to Application No. 2019621.
Datta Benur Creation, "How to make a paper helicopter—360 degree rotating," <https://www.youtube.com/watch?v=AVqxibRGm2g>; Nov. 9, 2016, XP054978381.

* cited by examiner

CONTAINER FOR AERIAL DELIVERY OF GOODS

The invention relates to the field of containers designed for aerial deliveries of goods, in particular a container delivered by a manned or an unmanned aerial vehicle.

BACKGROUND OF THE INVENTION

Humanitarian aid organizations and governments are confronted with crises ranging from natural disasters to man-made hazards. In such situations aid workers often face a lack of logistical organisation and infrastructure on site. Consequently, it is challenging to provide sufficient aid to people in need, safely, in time and within budget.

A solution to the abovementioned problem can be found in aerial deliveries of emergency packages, wherein the emergency packages may contain a variety of aid materials. Delivery of said humanitarian aid materials is often done by using unmanned aerial vehicles (UAV) such that there are no people facing direct risks. The UAV can drop the packages in a designated area. It is desirable to ensure that no damage is done to the contents of the package when it is dropped.

Reference U.S. Pat. No. 5,947,419A discloses an aerial cargo container system for transporting cargo from an aircraft to the ground having a cargo box with a continuous side wall with six rectangular side panels, and rotor blades having stowed positions against alternating box side panels and deployed positions extending outwardly from the box in a generally horizontal plane. Each blade may include a lower panel and an upper panel that has two triangular sections behind the leading edge that forms an aerodynamic camber. The blades are hinged to a rotor hub secured across the top of the box. The upward deployment of the blades is limited by tethers extending from the blades down to a tether attach frame secured across the bottom of the box. The box and blades are preferably formed of corrugated paper or plastic material. The entire unit rotates with the load to create aerodynamic braking and lower cargo to the ground with a minimum of energy being translated to the cargo on impact.

A disadvantage of the aerial cargo container of said reference is its complexity. Due to a multitude of parts which need to be assembled, e.g. a rotor hub, hinges, complex wings having camber, it requires extensive work to manufacture. Upon use of the cargo container, the wings need to be released to be unfolded, to perform their function. Therefore, U.S. Pat. No. 5,947,419A does not provide a cost efficient solution, as needed for large scale operations.

Reference U.S. Pat. No. 2,450,992A discloses a container which may be used to deliver supplies and equipment from aircraft to troops in battle, to firefighters in forest areas, or to persons stranded on islands, mountains or other isolated places not easily accessible by other mean. In descent, air strikes the underside of the wings and is directed toward the trailing edges thereof, thereby imparting a reaction force in the opposite direction. This causes the container to rotate around its longitudinal axis in a vertical position.

Another solution is to use a parachute for delivering a package. A disadvantage of the parachute is that it tends to drift due to winds which engage the parachute from the side. Because of the drift, it becomes increasingly difficult to accurately drop the package at a desired location.

SUMMARY OF THE INVENTION

It would be desirable to provide a container which allows deployment thereof by an aerial vehicle while maintaining the structural integrity upon landing of goods contained by the container. It would further be desirable to provide a container which is easy to manufacture, easy to assembly by non-skilled personnel, while maintaining structural integrity, and predictable performance of the container during operation. It would yet further be desirable to provide a cost efficient container. It would also be desirable to provide a container which can be stored efficiently.

To better address one or more of these concerns, in a first aspect of the invention a container is provided, comprising:
  a bottom section, comprising a plurality of edges;
  a plurality of side walls, wherein each side wall comprises an upper edge, lower edge, and two opposing side edges, wherein each side wall extends upwardly from a corresponding edge of the bottom section and is connected at its lower edge to a corresponding edge of the bottom section, and wherein the plurality of side walls circumferentially enclose a packing volume, wherein each side wall is connected to at least one adjacent side wall at corresponding side edges of the adjacent side walls to form a series of interconnected side walls;
  a wing structure comprising a plurality of wings, wherein each wing is integrally connected to a corresponding side wall at the upper edge of the side wall, and wherein each wing is pivotable around a pivot axis defined by the upper edge of the corresponding side wall between a passive position, in which the wing extends along the corresponding side wall, and a deployed position, in which the wing extends substantially transversely relative to the corresponding side wall;
  a plurality of reinforcing units, one for each wing, to increase the bending stiffness of the wing for preventing bulging of the wings; and
  a plurality of retaining units, one for each wing, to limit pivoting of the corresponding wing beyond the deployed position,
  wherein the wing structure, in the deployed position of the wings, is configured to not rotate the container during flight, and to keep the container in an upright orientation.

An advantage of the container of the invention is that it has a simple structure and maintains structural integrity while descending in the air.

With the wing structure as defined, the descent of the container in the air will have a large vertical component and a relatively small horizontal component, when considered in free fall with low horizontal wind speed. The wing structure ensures the container to be non-rotating during flight, and to keep an upright orientation. The wing structure creates drag during flight, instead of lift that could create rotation and/or drift.

An advantage of avoiding rotation of the container during the descent is that the goods inside the container are not affected by centrifugal forces which, if present, could reposition or damage said goods. A rotation might force the packed goods to move inside the box, and might destabilize an axis of rotation of the container due to an unbalance of the container with respect to the axis of rotation.

Another advantage of avoiding rotation of the container is that on impact of the container on the ground, no possibly disruptive horizontal torsion forces are exerted on the box.

Yet another advantage of avoiding rotation of the container is that the container will descent with a more vertical trajectory compared to the rotating devices as disclosed in references U.S. Pat. Nos. 5,947,419A and 2,450,992A. Due to their rotation the flight of the devices of said references will have a larger horizontal component, or drift during their descent, which makes it more difficult to predict where the devices will land. The container according to the invention will descend substantially vertically, thereby making the landing location easier to predict.

The reinforcing units in particular prevent the wings from bulging or deflecting. In this way, a large wing area may be utilized which is beneficial from a drag resistance perspective. Limiting a pivot angle between the wings and the side walls by the retaining units also allows for a large wing area, in particular when the pivot angle is configured to be around 90 degrees.

When dropping the container with the wings in passive position from an aerial vehicle, the wings will take the deployed position automatically by air flowing under the wings.

The connection between the wing and the corresponding side wall at the upper edge of the side wall provides a simple construction. As each wing and corresponding side wall are integrally connected to each other, there is no need for extra parts, such as a hinge, or for an assembly of parts.

The design of the container allows it to be made of a single blank of for example cardboard of appropriate structural strength, thereby allowing blanks to be stacked and thus stored efficiently using a minimum volume. As the blank only needs to be folded in order to create the container, setting up a container on site is quite simple. The reinforcing units may be provided on the wings during fabrication.

In an embodiment of the container, each wing is a flat panel and, in the deployed position of the wing, a cross-section of the wing at rights angles to a central longitudinal line of the wing extends horizontally when the container is in the upright orientation.

In an embodiment of the container, the reinforcing unit of each wing comprises two plate-shaped reinforcing flaps, the reinforcing flaps being provided along opposite longitudinal edges of the wing parallel to the central longitudinal line of the wing.

In an embodiment of the container, the reinforcing flaps are integrally connected to the wing via folding lines, the reinforcing flaps being configured to be folded along the folding lines in order to extend at substantially right angles to the wing when the wing is in the deployed position.

The reinforcing flaps may be folded such that the flaps either extend upwards from the wing, or downwards from the wing when the wing is in the deployed position. The flaps may also be folded back on the corresponding wing edges.

In an embodiment of the container, the reinforcing unit comprises a plate-shaped reinforcing flap connected to a bottom side of the wing along a longitudinal line of the wing, wherein the reinforcing flap is configured to extend parallel to the wing when the wing is in the passive position, and to extend substantially at right angles to the wing when the wing is in the deployed position.

The plate-shape reinforcing flap allows the wing in the passive position to be substantially parallel, i.e. to be folded substantially parallel, to the corresponding side wall. This improves the compactness of the container and is beneficial in case multiple containers are transported side by side.

In an embodiment of the container, the retaining unit comprises a plate-shaped retaining flap connecting the wing or the reinforcing unit thereof to the corresponding side wall or the bottom section, wherein the retaining flap is configured to extend parallel to the side wall when the wing is in the passive position, and to extend substantially at right angles to the side wall when the wing is in the deployed position.

The plate-shape retaining flap allows the wing in the passive position to be substantially parallel, i.e. to be folded substantially parallel, to the corresponding side wall. This improves the compactness of the container and is beneficial in case multiple containers are transported side by side.

In an embodiment of the container, the retaining unit comprises a retaining flap cut out of the wing along cutting lines parallel to a longitudinal extension of the wing, wherein the side wall corresponding to the wing comprises a retaining flap cut out of the side wall along cutting lines parallel to the side edges of the side wall, and wherein the retaining flap of the wing is configured to be connected to the retaining flap of the side wall to form a retaining unit.

In an embodiment of the container, the retaining unit comprises a tether connecting the wing or the reinforcing unit thereof to the corresponding side wall or the bottom section.

In an embodiment of the container, the tether comprises a fibre reinforced tape.

In an embodiment of the container, the tether extends from the reinforcing member of a wing via the bottom section of the container to a reinforcing member of an opposite wing.

The tether provides a simple solution for preventing the wings from overextending beyond their deployed position.

In an embodiment of the container, in the deployed position of the wings, a pivot angle between each wing and the corresponding side wall ranges from approximately 90 to approximately 120 degrees, in particular between approximately 90 and approximately 110 degrees.

In an embodiment of the container, the container further comprises a closing wall having a side edge and an upper edge, wherein the side edge of the closing wall is connected to a side edge of a first side wall of the series of side walls, and the closing wall is configured to overlap at least part of an inner side of a last side wall of the series of side walls.

In an embodiment of the container, a cover section is connected to the upper edge of the closing wall, wherein the cover section is configured to close the packing volume of the container.

The cover section provides a closed container, which has the advantage that goods inside the container are prevented from falling out, also during a falling phase of the container.

In an embodiment of the container, the container comprises a sheet, such as a canvas sheet, extending along the wings at their sides facing away from the side walls, the sheet having edge portions being folded around end parts of the plurality of wings.

The sheet increases the total wing area, thereby increasing the drag resistance of the container. This is beneficial for the goods inside the container and the container itself, as the impact on the container upon landing tends to decrease.

In an embodiment of the container, wherein the canvas is a rectangular canvas, the rectangular canvas forms an octagonal air breaking when the wings are in the deployed position (using four wings).

In an embodiment of the container, a lower part of the packing volume of the container comprises an absorption member configured to absorb an impact on landing of the container, and an upper part of the packing volume is configured to contain cargo. The absorption member may be placed inside the container as a separate piece.

The absorption member is beneficial for the goods inside the container, as the absorption member dissipates the energy of the goods upon impact of the container on the ground.

In an embodiment of the container, a ratio between a height of the lower part and a height of the upper part in the packing volume is changeable to adjust a absorption capacity of the container.

In an embodiment of the container, the cargo comprises one or more of a water container, a blanket, and a food box.

In an embodiment of the container, the absorption member comprises an interlocking structure, in particular a honeycomb structure.

In an embodiment of the container, the wings, the side walls and the bottom section of the container are made from a single cardboard blank.

Advantages of making the container from a single cardboard blank are low production costs, easy manufacturing, and efficient stackability and transportability.

In an embodiment of the container, each wing of the single cardboard blank further comprises plate-shaped reinforcing flaps which are provided along opposite edges of the wing parallel to the central longitudinal line of the wing, wherein the reinforcing flaps are integrally connected to the wings via folding lines.

In an embodiment of the container, the cardboard blank further comprises a closing wall and a cover section.

In an embodiment of the container, the side walls and the wings are shaped as flat panels.

In an embodiment of the container, each side wall of the container has a rectangular shape.

In an embodiment of the container, each wing has a rectangular shape.

In an embodiment of the container, the container comprises four side walls and four wings.

In an embodiment of the container, the reinforcing unit and the retaining unit comprise:
- a reinforcing adhesive flap and a reinforcing member, wherein the reinforcing member is a trapezoid and the reinforcing adhesive flap is connected to a larger base of the reinforcing member,
- a retaining adhesive flap and a retaining member, wherein the retaining member is a trapezoid and the retaining adhesive flap is connected to a larger base of the retaining member, wherein:
- a leg of the reinforcing member is connected to a leg of the retaining member,
- the reinforcing adhesive flap is adhered to the bottom side of the wing, such that the larger base of the reinforcing member extends substantially perpendicular to the upper edge of the corresponding side wall along the wing;
- the retaining adhesive flap is adhered to the outside of the side wall, such that the larger base of the retaining member extends substantially perpendicular to the upper edge of the corresponding side wall along the side wall;
- in the passive position of the wing, the reinforcing member and the retaining member face each other, and extend substantially parallel to the side wall,
- in the deployed position of the wing, the reinforcing member extends substantially vertically away from the bottom side of the wing, and the retaining member extends substantially horizontally away from the side wall.

These and other aspects of the invention will be more readily appreciated as the same becomes better understood by reference to the following detailed description and considered in connection with the accompanying drawings in which like reference symbols designate like parts.

DETAILED DESCRIPTION OF THE FIGURES

Figure 1:
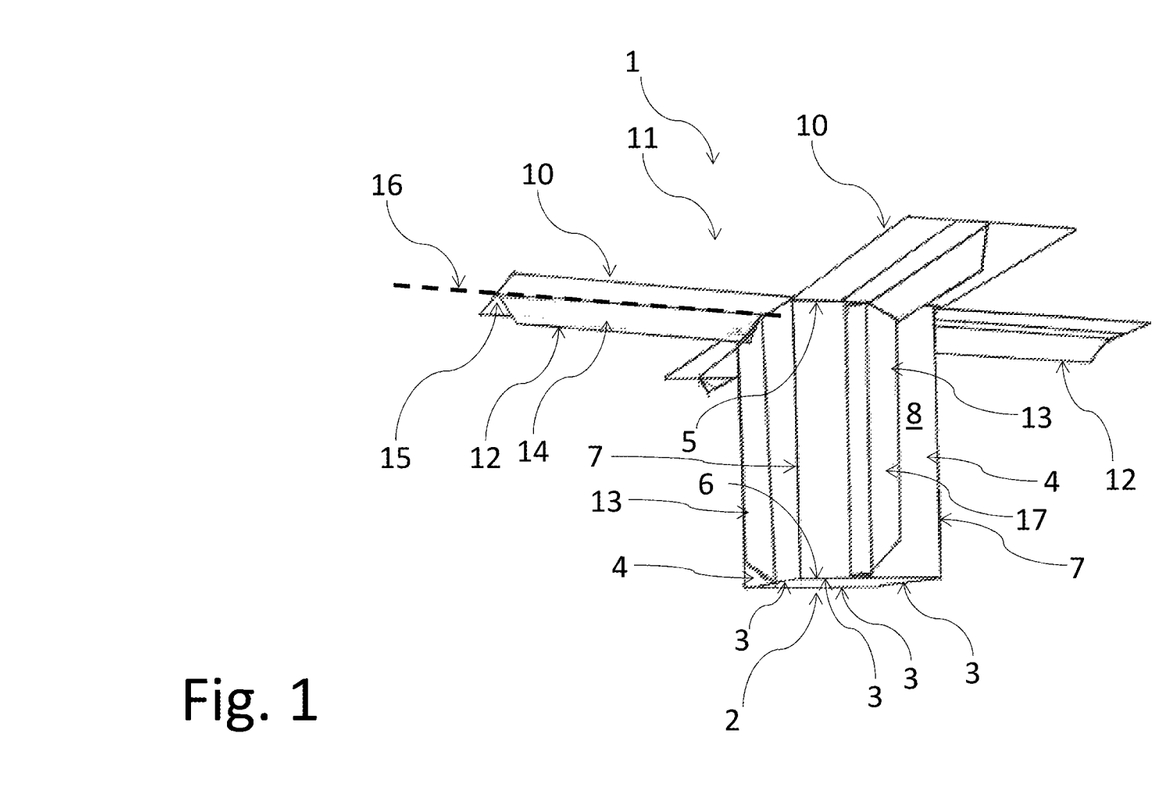
FIG. 1 depicts a perspective view of an embodiment of a container according to the present invention.

FIG. 1 depicts an example embodiment of a container 1 for dropping from an aerial vehicle. The container 1 has a rectangular bottom section 2 with four edges 3. The container has four side walls 4, wherein each side wall 4 has an upper edge 5, a lower edge 6, and two opposing side edges 7. Each side wall 4 extends upwardly from a corresponding edge 3 of the bottom section 2 and is connected at its lower edge 6 to the corresponding edge 3 of the bottom section 2. The wings 10 and side walls 4 have a rectangular shape.

Each side wall 4 is connected to at least one adjacent side wall 4 at corresponding side edges 7 of the adjacent side wall 4. A series of interconnected side walls 9 is formed, wherein the side walls 4 circumferentially enclose a packing volume 8.

The container 1 has four wings 10. Each wing 10 is connected to a corresponding side wall 4 at the upper edge 5 of the side wall 4. FIG. 1 depicts in particular a deployed position 11 of the wings 10, wherein each wing 10 extends substantially transversely relative to the corresponding side wall 4. The wings 10 are configured to pivot around a pivot axis defined by the upper edge 5 of the corresponding side wall 4, between a passive position and the deployed position 11. In the passive position, the wings 10 extend along the corresponding side wall 4, preferably parallel to the corresponding side wall 4. In the deployed position, the wings 10 extend preferably perpendicular relative to their corresponding side wall 4. In this way, most of the wing surface may be used to break a fall of the container 1 during its flight in the air.

The wing structure, in the deployed position, is configured to not rotate the container during flight, or descent, and to keep the container in an upright orientation.

In the deployed position of the wings 10, a pivot angle between each wing 10 and the corresponding side wall 4 ranges from approximately 90 to approximately 120 degrees, more preferably between approximately 90 and approximately 110 degrees.

Each wing 10 is a flat panel, as can be seen in FIGS. 1, 2, 3, 6A, 6B, 6C, 7A, 7B and 8. In the deployed position of the wing, a cross-section of the wing at rights angles to a central longitudinal line 16 of the wing 10 extends horizontally when the container is in the upright orientation. This further ensures the non-rotation of the container during its descent. If said cross-section of the wing would extend under an angle to the horizontal, the wings would induce a rotation during the descent of the container.

Each wing 10 is provided with a reinforcing unit 12. The reinforcing unit 12 increases the bending stiffness of the wing 10, which prevents bulging, or undesired deflections of the wings 10.

In the embodiment shown, the reinforcing unit 12 comprises a plate-shaped reinforcing flap 14 which is connected to a bottom side 15 of the wing 10 along a longitudinal line 16 of the wing, in particular a central longitudinal line 16. The reinforcing flap 14 extends along the wing 10, i.e. parallel to the wing 10, when the wing 10 is in the passive position. In the deployed position 11 of the wing 10, the reinforcing flap 14 extends substantially at right angles to the wing 10 from the bottom side 15 thereof.

The container 1 is also provided with retaining units 13. The retaining units 13, one for each wing 10, limit pivoting of the corresponding wing 10 beyond the deployed position. In this way, the largest wing surface may be utilized when the container 1 descends in the air, which is beneficial to limit a falling velocity as much as possible.

In the embodiment shown, the retaining unit 13 comprises a plate-shaped retaining flap 17. The retaining flap 17 connects the corresponding wing 10, in particular the reinforcing unit 12, to the corresponding side wall 4.

It is also possible to connect the wing 10 or reinforcing unit 12 thereof to the bottom section 2 with the retaining flap 17. The retaining flap 17 extends along the side wall 4, i.e. parallel to the side wall 4, when the wing 10 is in the passive position. In the deployed position, which is the position shown in FIG. 1, the retaining flap 17 extends substantially at right angles to the side wall 4.

Figure 2A:
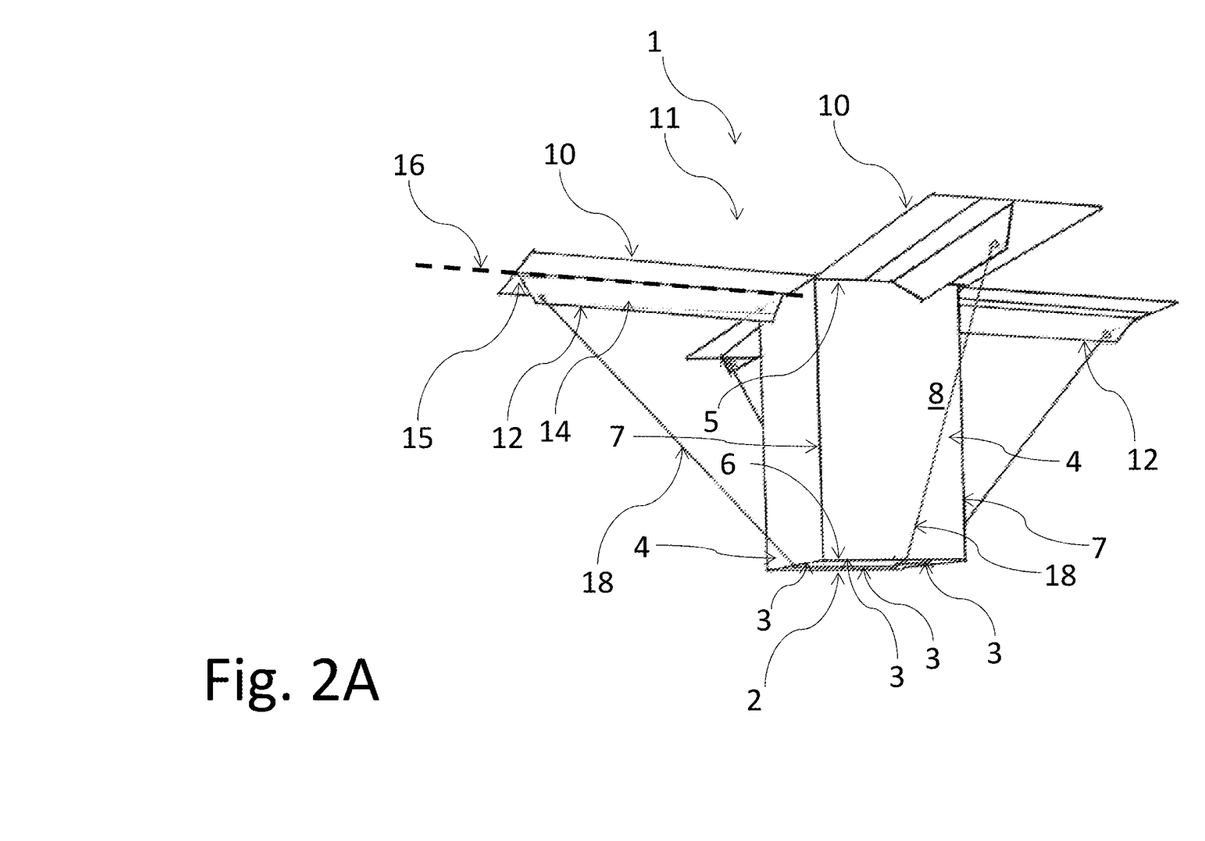
FIG. 2A depicts a perspective view of another embodiment of the container according the invention.

In FIG. 2A another embodiment of a retaining unit is shown, in particular a tether 18. The tether 18 connects the wing 10 or the reinforcing unit 12 thereof to the bottom section 2. It is also possible to connect the wing 10 or the reinforcing unit 12 thereof to the side wall 4 with the tether 18. The tether 18 mainly experiences tensile forces. An appropriate material for the tether 18 can be chosen accordingly. In an embodiment of the present invention, the tether is made from a fibre reinforced tape. The use of other materials is also possible.

The tether 18 can also extend from the reinforcing unit 12 of the wing 10 via the bottom section 2 to the reinforcing unit 12 of the opposite wing 10. In that case, the tethers 18 of all wings 10 may join at the bottom section 2.

Figure 2B:
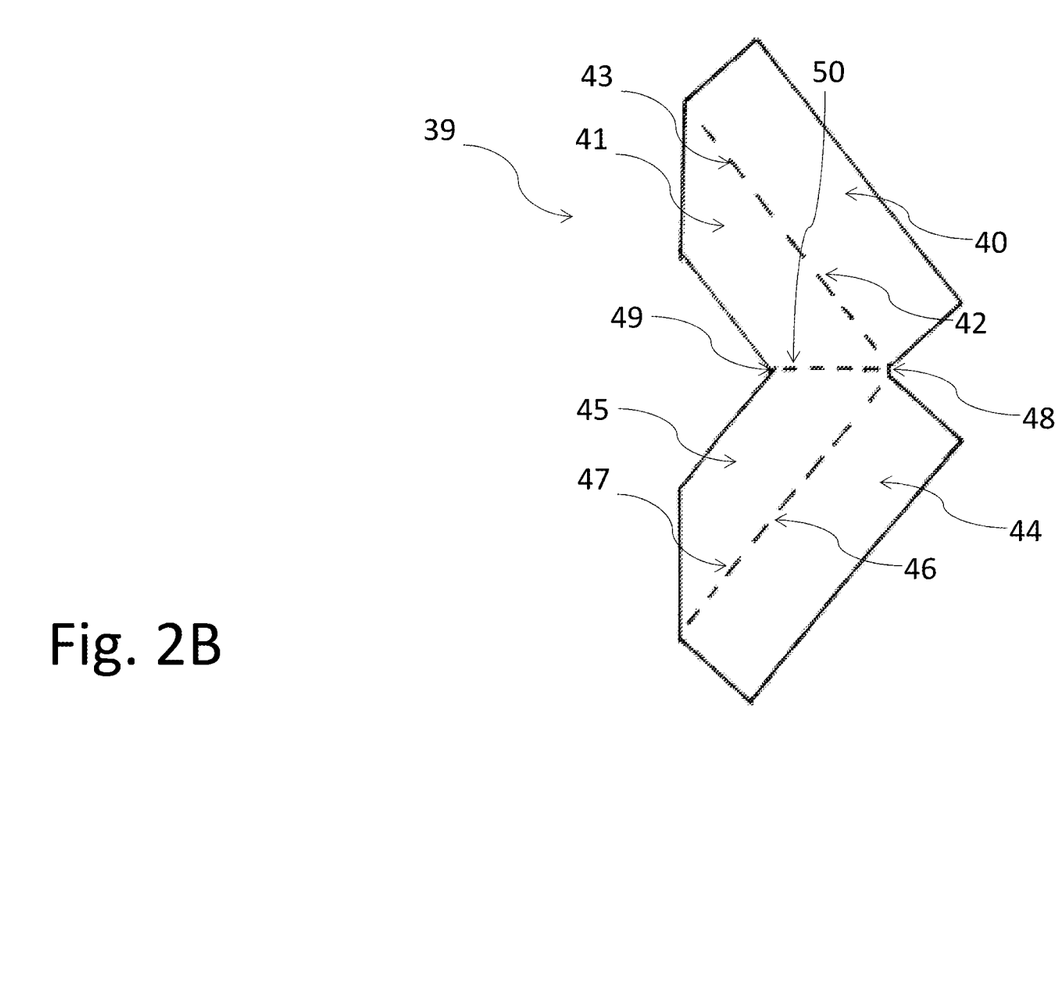
FIG. 2B depicts a top view of a retaining and reinforcing unit.

FIG. 2B shows an embodiment of the retaining unit 13 which is integrally connected to the reinforcing unit 12. An integrally formed blank 39 is provided for manufacturing of the integrally connected retaining unit 13 and reinforcing unit 12, and has a reinforcing flap 40 and a reinforcing member 41. The reinforcing member 41 is shaped as a trapezoid and the reinforcing flap 40 is connected to a larger base 42 of the reinforcing member 41 via a reinforcing fold line 43.

The blank 39 further has a retaining flap 44 and a retaining member 45. The retaining member 45 is shaped as a trapezoid and the retaining flap 44 is connected to a larger base 46 of the retaining member 45 via a retaining fold line 47.

The reinforcing flap 40 and the retaining flap 44 may be provided with an adhesive layer, such as a self-adhesive layer, at one side to facilitate a connection of the reinforcing flap 40 to the bottom side 15 of the corresponding wing 10, and a connection of the retaining flap 44 to the corresponding side wall 4.

A leg 48 of the reinforcing member 41 is connected to a leg 49 of the retaining member 45 via a support fold line 50.

In the embodiment shown, the reinforcing flap 40 is a rectangle. A larger side of the reinforcing flap 40 is connected to the reinforcing member 41 via the reinforcing fold line 43.

In the embodiment shown, the retaining flap 44 is a rectangle, and a larger side of the retaining flap is connected to the retaining member 45 via the retaining fold line 47.

Figure 3:
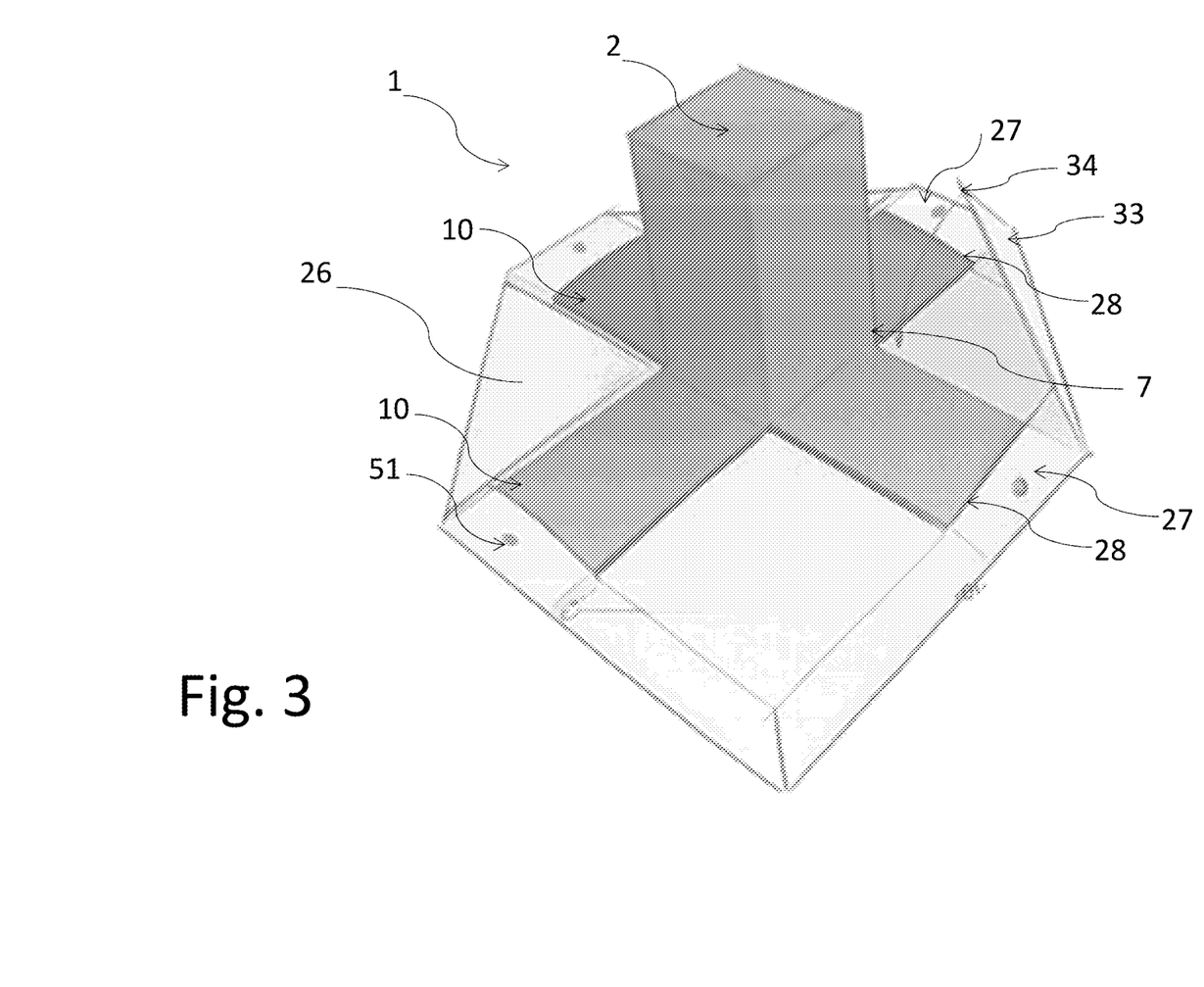
FIG. 3 illustrates a perspective view of an embodiment of the container, in particular an embodiment with a sheet, wherein retaining units and reinforcing units have been omitted for clarity.

Referring to FIG. 3, a sheet 26 is shown which is provided on the container 1, in particular on the wings 10 thereof. The sheet 26 has a generally rectangular shape, and extends along the wings 10 at their sides facing away from the side walls 4. Corner portions 33 of the sheet 26 are folded with a corner part 34 towards an opposing edge 7 of the side wall 4. Edge portions 27 of the sheet 26 are folded around end parts 28 of the wings 10. In this way, an octagonal total wing shape is obtained, when seen in top view. Retaining units 13 in the form of tethers 18 can be connected to connection holes 51 provided in the sheet 26.

The sheet 26 increases the total surface of the wings 10, thereby decreasing a falling velocity when the container 1 descends in the air. This is beneficial for reducing the impact upon landing.

In the passive position of the wings 10, the container 1 is compact, as the wings 10 extend along the side walls 4. In the passive position of the wings 10, multiple containers 1 can be transported compactly as well, when arranged side by side. Providing the sheet 26 on the container 1 does not substantially change the compactness of the container 1 in the passive position of the wings 10, as the sheet 26 is folded around the wings 10 and extends along the wings 10. The flexible triangular canvas parts between the wings 10 may be folded on the wings 10.

When released from an aerial vehicle, the sheet 26, and thus the wings 10, unfold automatically. This is also the case when no sheet 26 is provided on the container 1, resulting in automatically deploying wings 10.

Figure 4:
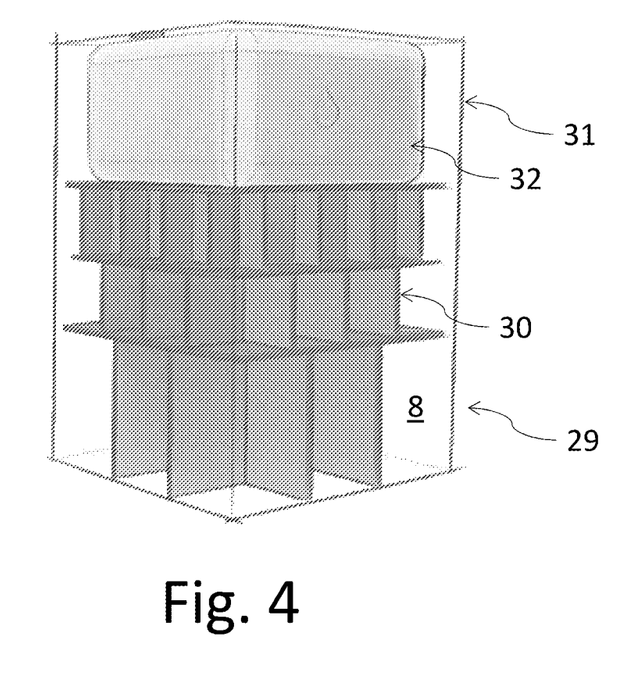
FIG. 4 illustrates a perspective view of an arrangement of a packing volume inside the container.

FIG. 4 illustrates an arrangement of the packing volume 8. A lower part 29 of the packing volume 8 comprises an absorption member 30 for absorbing a mechanical impact on the container upon hitting a ground surface. In fact, in the shown embodiment multiple, in this case three, absorption members are shown, wherein a material density of the absorption members 30 increases from the bottom of the container 1 to the top thereof.

An upper part 31 of the container 1 may contain a payload or cargo. The cargo can comprise all sorts of material. In case of human aid materials, the cargo may comprise one or more of a water container, a blanket, and a food box, for example. The absorption member(s) 30 prevent(s) damage to the cargo due to the impact on landing.

Figure 5:
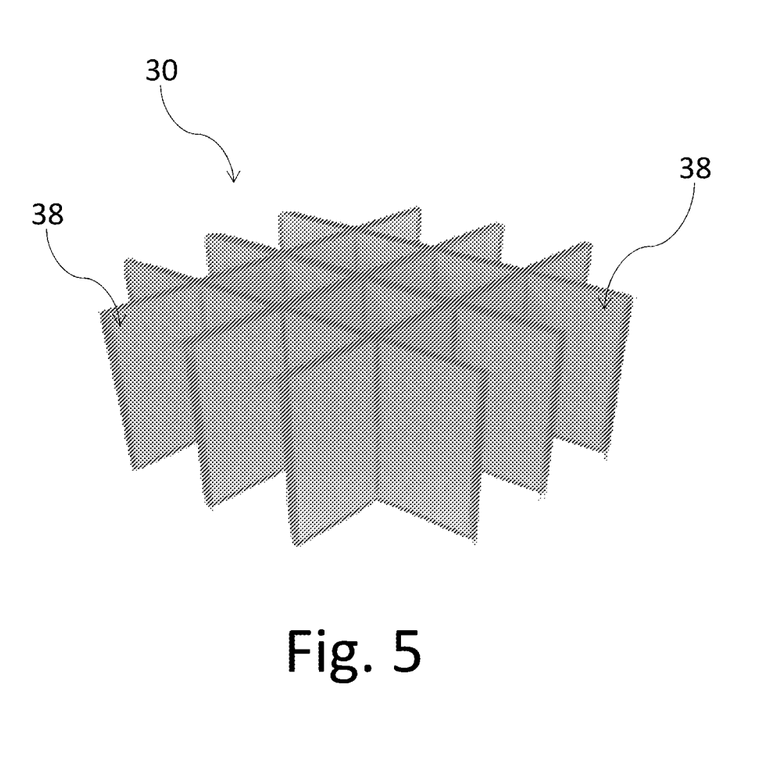
FIG. 5 depicts a perspective view of an embodiment of an absorption member, or part thereof.

An embodiment of the absorption member 30 is shown in more detail in FIG. 5. The absorption member 30 has an interlocking structure, in particular a honeycomb structure. The arrangement of FIG. 5 is obtained by an arrangement of vertically placed cardboard plates 38 which interconnect. As shown in FIG. 4, several of these absorption members 30 can be provided inside the container, by stacking them. The exact dimensions and the number of cardboard plates 38 of the absorption member(s) 30 can be adapted according to the type and mass of the cargo.

Figure 6A:
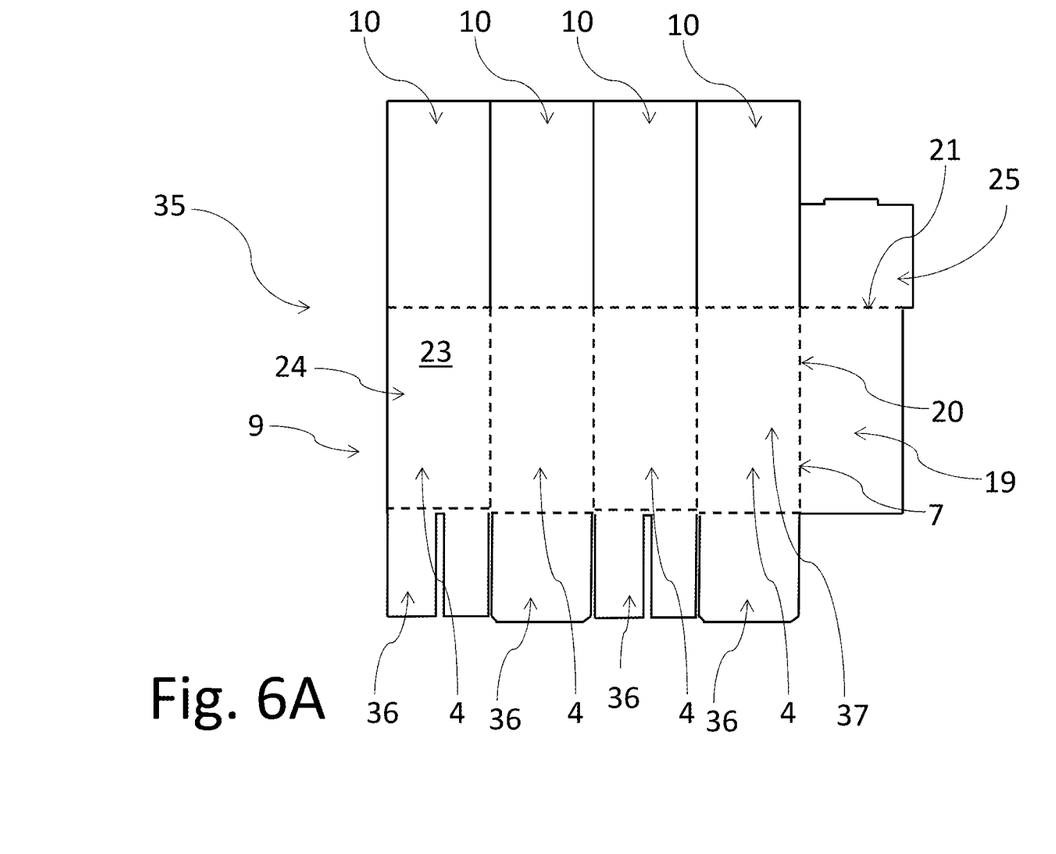
FIG. 6A depicts a top view of a blank assembly of an embodiment of the container according to the invention.

An advantage of the present invention, is that the container 1 may be made of a simple cardboard blank 35, as shown in FIG. 6A. The blank 35 comprises the four wings 10, four side walls 4, and four bottom parts 36. The wings 10 and side walls 4 are therefore shaped as flat panels. The bottom parts 36 make up the bottom section 2. The dashed lines are folding lines about which the wings 10, side walls 4, and bottom parts 36 are folded. Due to the design of the blank, the container 1 can be assembled without the use of external necessities, like tape or adhesives. The reinforcing units 12 and/or retaining units 13 may be provided on the blank 35.

Figure 6B:
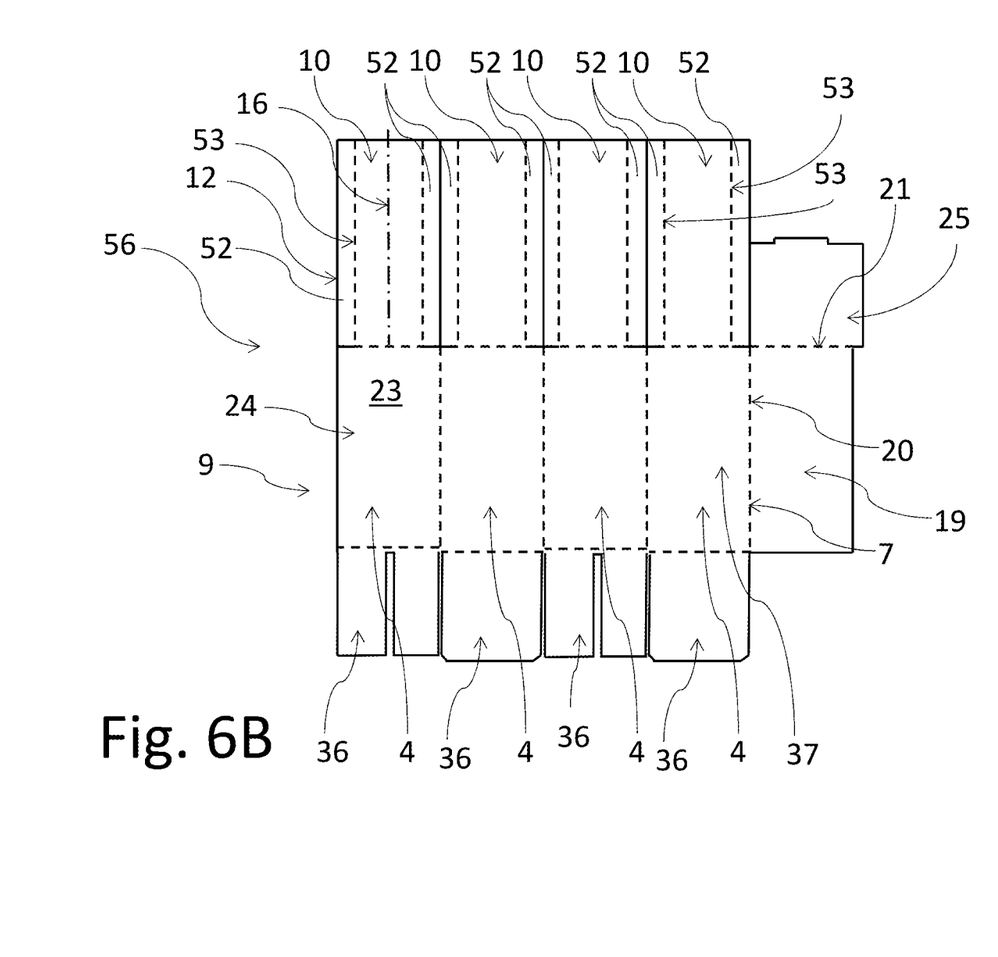
FIG. 6B depicts a top view of a blank assembly of another embodiment of the container according to the invention.

FIG. 6B shows another embodiment of a simple cardboard blank 56. The blank 56 also comprises the four wings 10, four side walls 4, and four bottom parts 36. Each wing 10 is connected to two plate-shaped reinforcing flaps 52, which act as reinforcing unit 12. The reinforcing flaps 52 are provided along opposite sides of the wing 10 parallel to the central longitudinal line 16 of the wing.

The wings 10 may be integrally connected to the reinforcing flaps 52 via folding lines 53. The reinforcing flaps 52 are configured to be folded along said folding lines 53 in order to extend at substantially right angles to the wing when the wing is in the deployed position.

Figure 6C:
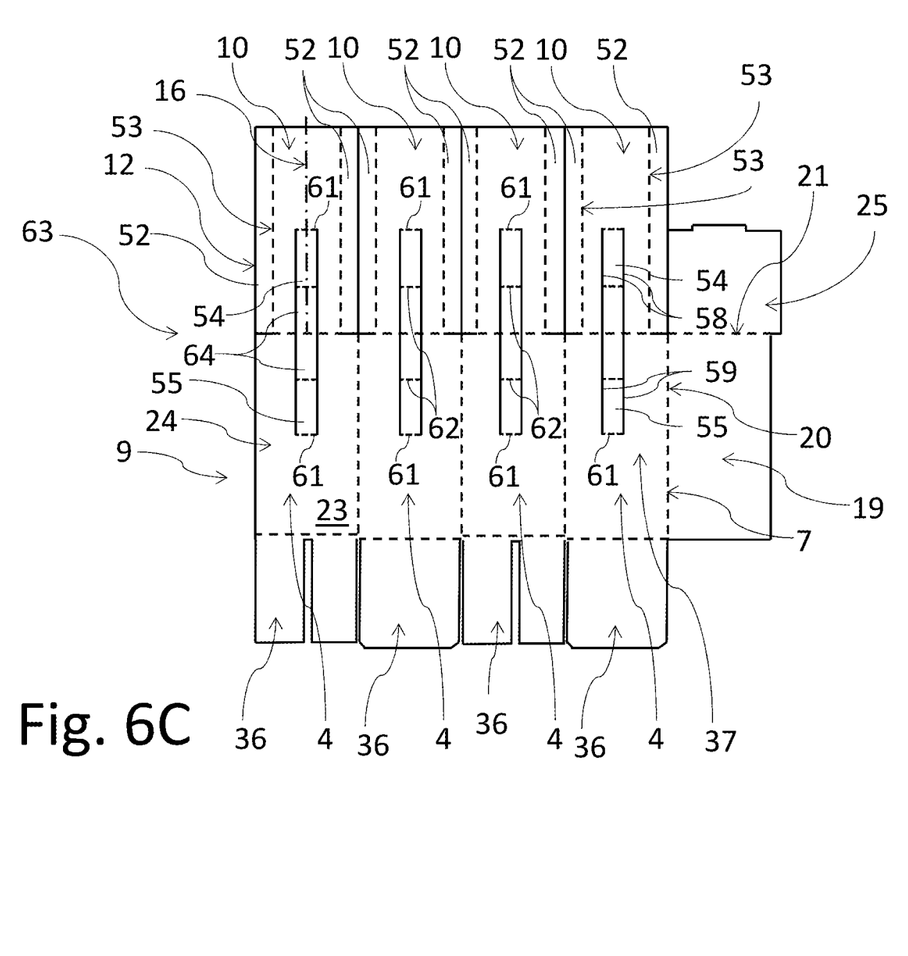
FIG. 6C depicts a top view of a blank assembly of another embodiment of the container according to the invention.

FIG. 6C shows yet another embodiment of a simple cardboard blank 63. The blank 63 also comprises the four wings 10, four side walls 4, and four bottom parts 36. Each wing 10 is connected to two plate-shaped reinforcing flaps 52, which act as reinforcing unit 12. The reinforcing flaps 52 are provided along opposite sides of the wing 10 parallel to the central longitudinal line 16 of the wing.

Figure 8:
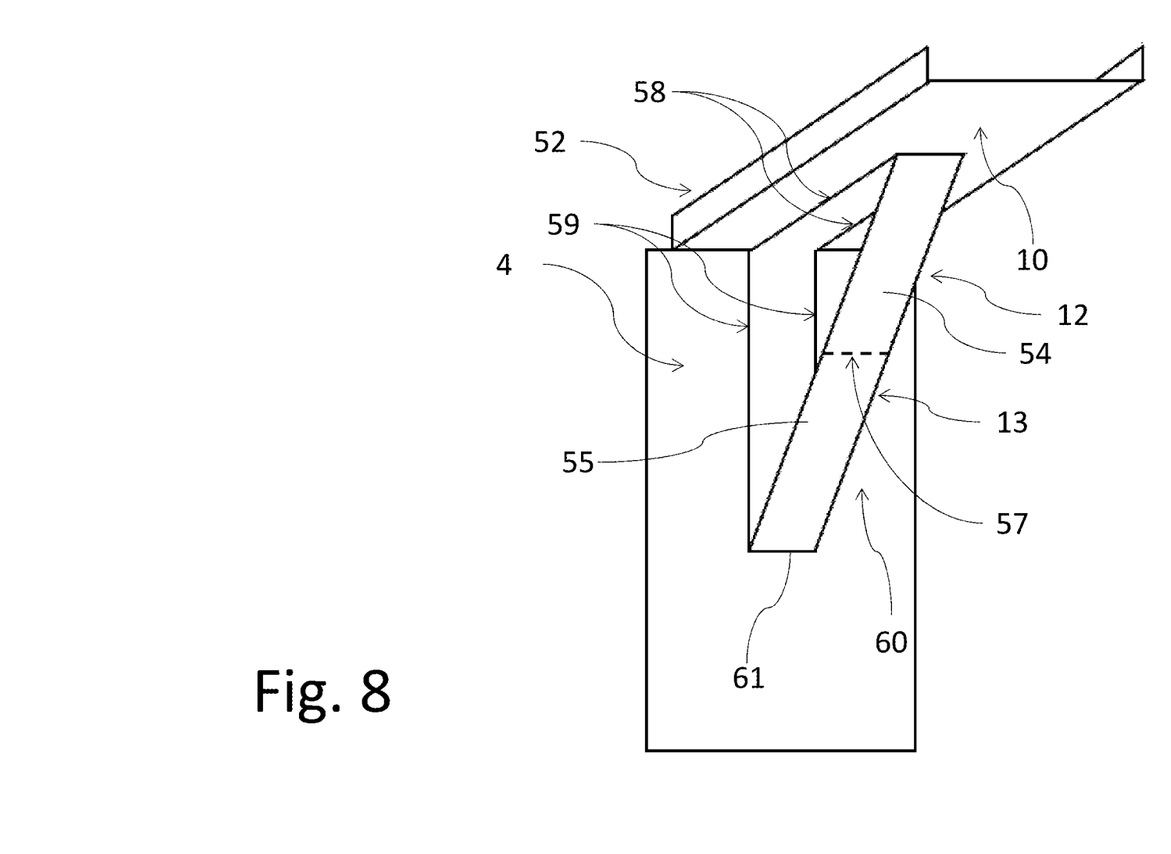
FIG. 8 depicts in perspective view another embodiment of the retaining unit.

The blank 63 further comprises a retaining flap 54 cut out of the wing along cutting lines 58 parallel to the longitudinal extension of the wing. The side wall 4 corresponding to the wing 10 comprises a retaining flap 55. Retaining flap 55 is cut out of the side wall along cutting lines 59 parallel to the side edges of the side wall 4. The retaining flap 54 of the wing 10 is configured to be connected to the retaining flap 55 of the side wall 4 to form a retaining unit 60 (FIG. 8). In the shown embodiment, the retaining flaps 54, 55 may be connected to each other at connection lines 62. The retaining flaps 54, 55 pivot over corresponding folding lines 61. Remaining parts 64 may be removed, at least largely, thereby obtaining the retaining unit 60 as shown in FIG. 8.

The blanks 35, 56, 63 may further comprise a closing wall 19. The closing wall 19 has a side edge 20 which is connected to a side edge 7 of a first side wall 37 of a series 9 of interconnected side walls 4. When folded in order to create the container 1, the closing wall 19 overlaps at least part of an inner side 23 of a last side wall 24 of the series of interconnected side walls 4.

The closing wall 19 further has an upper edge 21. The upper edge 21 is connected to a cover section 25. The cover section 25 folds about the dashed folding line between the cover section 25 and the closing wall 19 in order to close the packing volume of the container 1. The cover section 25 prevents cargo from falling out of the container 1 during the drop and upon landing. In some embodiments, the blanks 35, 56, 63 may not comprise the closing wall 19 and/or cover section 25.

The container may have various shapes and sizes. In particular, the bottom section 2 may be polygonal to have three or more sides, such as four, six or eight sides, and a corresponding number of side walls 4 and wings 10. In the exemplary embodiments as explained above, the bottom section 2 has four sides, and the container 1 comprises four side walls 4 and four wings 10.

Figure 7A:
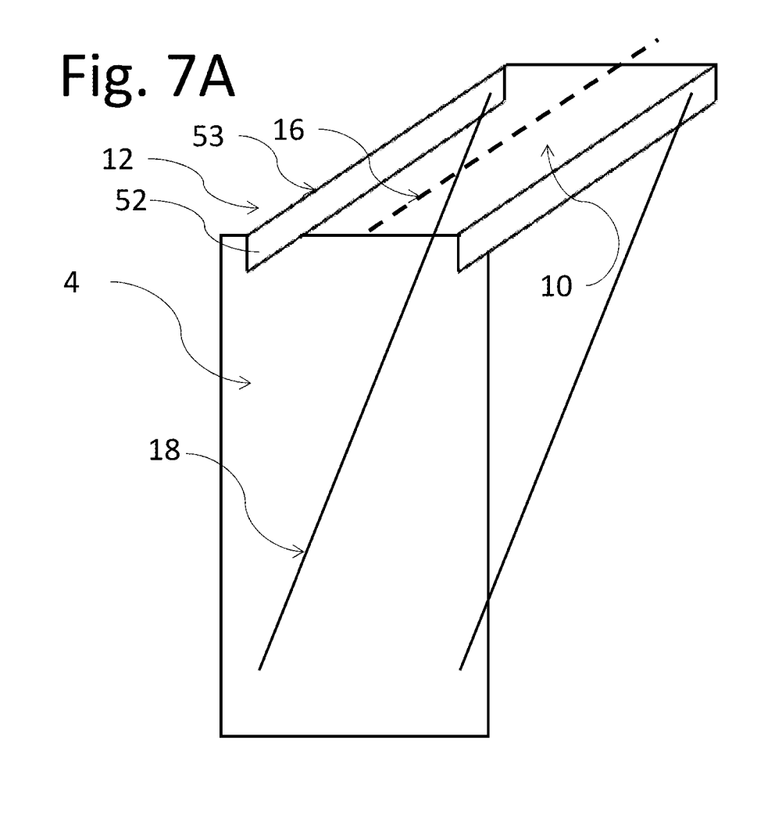
FIGS. 7A and 7B depict perspective views of embodiments of a reinforcing unit, wherein FIGS. 7A and 7B only show a part of a container.
Figure 7B:
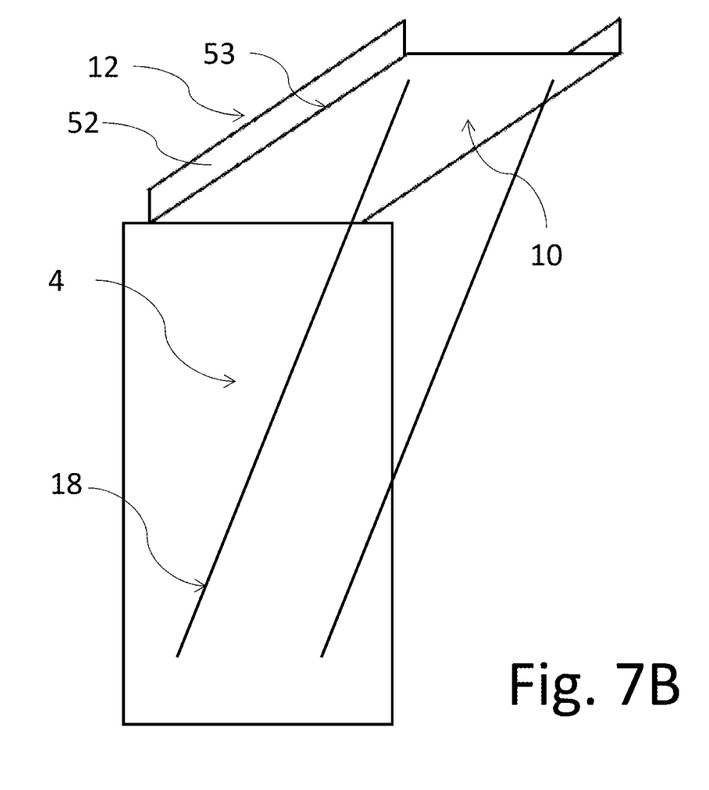

FIGS. 7A and 7B depict perspective views of embodiments of the reinforcing unit 12. A side wall 4 of a container is integrally connected to a wing 10. The wing 10 is in the deployed position. The reinforcing unit 12 comprises two plate-shaped reinforcing flaps 52 which are connected to the wing 10 along opposite sides of the wing parallel to a central longitudinal line 16 of the wing 10. The reinforcing flaps 52 can either extend downwards from the wing 10 when the wing 10 is in the deployed position, as shown in FIG. 7A, or upwards from the wing 10, when the wing 10 is in the deployed position as shown in FIG. 7B.

The reinforcing flaps 52 can be integrally connected to the wing via folding lines 53. The reinforcing flaps 52 will be folded along the folding lines 53 in order to extend at substantially right angles to the wing 10 when the wing 10 is in the deployed position.

The reinforcing flaps 52 may each be connected to a retaining unit in the form of a tether 18, as shown in FIG. 7A. The tethers 18 may also be connected to the wing 10, as shown in FIG. 7B. At the opposite end thereof, the tether 18 is connected to side wall 4.

FIG. 8 shows an embodiment of a retaining unit 60, wherein the retaining unit 60 comprises a retaining flap 54. Said retaining flap 54 is cut out of the wing 10 along cutting lines 58. The cutting lines 58 may be provided substantially parallel to a longitudinal extension of the wing 10. A side wall 4 corresponding to the wing 10 is connected to a retaining flap 55. Said retaining flap 55 is cut out of the side wall 4 along cutting lines 59. The cutting lines 59 may be provided parallel to the side edges of the side wall 4. The retaining 54 of the wing 10 is connected to the retaining flap 55 of the side wall 4, thereby forming a retaining unit 60. The retaining unit 60 comprises a folding line 57 to allow the wing 10 to be pivoted to a position parallel to the side wall 4 to stow the wing 10, whereby the retaining unit 60 is folded along the folding line 57.

The retaining unit 60 may be provided as both the reinforcing and retaining unit. Additionally, the wings may be provided with a reinforcing unit 12, such as the reinforcing flaps 52. Extra retaining units such as the tether 18 (FIGS. 7A, 7B) may also be provided.

As explained in detail above, a container for dropping from an aerial vehicle comprises a bottom section and a plurality of side walls. Wings are connected to the upper edges of the side walls to allow pivoting of the wing between a passive position, in which the wing extends along the corresponding side wall, and a deployed position, in which the wing extends substantially transversely relative to the corresponding side wall. Reinforcing units increase the bending stiffness of the wings. Retaining units limit pivoting of the wings beyond the deployed position.

As required, detailed embodiments of the present invention are disclosed herein. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention. Further, the terms and phrases used herein are not intended to be limiting, but rather, to provide an understandable description of the invention.

The terms "a"/"an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention claimed is:

1. A container for dropping from an aerial vehicle, comprising:
    a bottom section, comprising a plurality of edges;
    a plurality of side walls, wherein each side wall comprises an upper edge, a lower edge, and two opposing side edges, wherein each side wall extends upwardly from a corresponding edge of the bottom section and is connected at its lower edge to a corresponding edge of the bottom section, and wherein the plurality of side walls circumferentially enclose a packing volume, wherein each side wall is connected to at least one adjacent side wall at corresponding side edges of the adjacent side walls to form a series of interconnected side walls;
    a wing structure comprising a plurality of wings, wherein each wing is integrally connected to a corresponding side wall at the upper edge of the side wall, and wherein each wing is pivotable around a pivot axis defined by the upper edge of the corresponding side wall between a passive position, in which the wing extends along the corresponding side wall, and a deployed position, in which the wing extends substantially transversely relative to the corresponding side wall;
    a plurality of reinforcing units, one for each wing, to increase the bending stiffness of the wing for preventing bulging of the wings; and
    a plurality of retaining units, one for each wing, to limit pivoting of the corresponding wing beyond the deployed position,
    wherein the wing structure, in the deployed position of the wings, is configured to not rotate the container during flight, and to keep the container in an upright orientation.

2. The container according to claim 1, wherein each wing is a flat panel and, in the deployed position of the wing, a cross-section of the wing at rights angles to a central longitudinal line of the wing extends horizontally when the container is in the upright orientation.

3. The container according to claim 1, wherein, in the deployed position of the wings, a pivot angle between each wing and the corresponding side wall ranges from approximately 90 to approximately 120 degrees.

4. The container according to claim 1, wherein the reinforcing unit of each wing comprises two plate-shaped reinforcing flaps, the reinforcing flaps being provided along opposite longitudinal edges of the wing parallel to the central longitudinal line of the wing.

5. The container according to claim 4, wherein the reinforcing flaps are integrally connected to the wing via folding lines, the reinforcing flaps being configured to be folded along the folding lines in order to extend at substantially right angles to the wing when the wing is in the deployed position.

6. The container according to claim 5, wherein the plate-shaped reinforcing flaps are integrally connected to the wings via folding lines.

7. The container according to claim 4, wherein a tether extends from the reinforcing unit of the wing via the bottom section of the container to the reinforcing unit of the opposite wing.

8. The container according to claim 1, wherein the reinforcing unit comprises a plate-shaped reinforcing flap connected to a bottom side of the wing along a longitudinal line of the wing, wherein the reinforcing flap is configured to extend parallel to the wing when the wing is in the passive position, and to extend substantially at right angles to the wing when the wing is in the deployed position.

9. The container according to claim 1, wherein the retaining unit comprises a plate-shaped retaining flap connecting the wing or the reinforcing unit thereof to the corresponding side wall or the bottom section, wherein the retaining flap is configured to extend parallel to the side wall when the wing is in the passive position, and to extend substantially at right angles to the side wall when the wing is in the deployed position.

10. The container according to claim 1, wherein the retaining unit comprises a retaining flap cut out of the wing along cutting lines parallel to a longitudinal extension of the wing, wherein the side wall corresponding to the wing comprises a retaining flap cut out of the side wall along cutting lines parallel to the side edge of the side wall, and wherein the retaining flap of the wing is configured to be connected to the retaining flap of the side wall to form a retaining unit.

11. The container according to claim 1, wherein the retaining unit comprises a tether connecting the wing or the reinforcing unit thereof to the corresponding side wall or the bottom section.

12. The container according to claim 11, wherein the tether comprises a fibre reinforced tape.

13. The container according to claim 1, further comprising a closing wall having a side edge and an upper edge, wherein the side edge of the closing wall is connected to a side edge of a first side wall of the series of side walls, and the closing wall is configured to overlap at least part of an inner side of a last side wall of the series of side walls.

14. The container according to claim 13, wherein a cover section is connected to the upper edge of the closing wall, and wherein the cover section is configured to close the packing volume of the container.

15. The container according to claim 1, further comprising a sheet extending along the wings at their sides facing away from the side walls, the sheet having edge portions being folded around end parts of the plurality of wings.

16. The container according to claim 1, wherein a lower part of the packing volume comprises an absorption member configured to absorb an impact on landing of the container, and an upper part of the packing volume is configured to contain cargo.

17. The container according to claim 16, wherein the cargo comprises one or more of a water container, a blanket, and a food box.

18. The container according to claim 16, wherein the absorption member comprises an interlocking structure.

19. The container according to claim 1, wherein the wings, the side walls and the bottom section of the container are made from a single cardboard blank.

20. The container according to claim 19, wherein the cardboard blank further comprises a closing wall and a cover section.

21. The container according to claim 1, wherein the side walls and the wings are shaped as flat panels.

22. The container according to claim 1, wherein each side wall of the container has a rectangular shape.

23. The container according to claim 1, wherein each wing has a rectangular shape.

24. The container according to claim 1, wherein the container comprises four side walls and four wings.

* * * * *